Patented June 9, 1953

2,641,581

UNITED STATES PATENT OFFICE 2,641,581

METHOD OF TRANSMITTING HEAT

Ettore Da Fano, Somerville, N. J., assignor, by mesne assignments, to John B. Pierce Foundation, New York, N. Y., a corporation of New York No Drawing. Application August 3, 1949, Serial No. 108,430. In Great Britain December 6, 1948

2 Claims. (Cl. 252—78)

This invention relates to new processes for using new compositions of matter as heat transfer media and more particularly to such new processes in which the compositions of matter used as the heat transfer media have improved fluidity and low viscosity at low temperatures, low freezing points or pour points, high boiling points, fluidity over wide ranges of temperature and increased resistance to hydrolysis as compared to known organic heat transfer media.

More particularly this invention relates to new processes for using new compositions of matter derived, in one preferred way, by the substitution of from one to three alkyl radicals for an equivalent number of aryl radicals in the tetra-aryl orthosilicates either in pure form or in mixtures to obtain fluids particularly useful in processes employing the same as heat transfer media having improved resistance to hydrolysis, reduced viscosities at low temperatures, high boiling points, low freezing points or pour points at lowest temperatures obtainable.

This application is a continuation-in-part of my copending application Serial No. 44,617, filed August 17, 1948, for Compositions of Alkyl-aryl Orthosilicates and Process for Using Same and includes matter divided out of this application by requirement of the Patent Office.

The tetra-aryl orthosilicates are described in the patent to Lotte H. Johnston No. 2,335,012, dated November 23, 1943. Experience with these silicates has demonstrated that precautions must be taken to protect them from water as they then readily hydrolyze, deteriorate and become unfit for use as heat transfer media. Certain of these silicates become extremely viscous at low temperatures and have pour points approaching —40° F. and cannot be pumped thus making them unfit for use in processes employing them as heat transfer media at such low temperatures.

The new compositions of matter which I have discovered and produced in pure form and as mixtures all exhibit these improved characteristics in processes employing them as heat transfer media as will more fully appear hereinafter and thus provide a group from which individual members, compounds or mixtures may be selected to meet the requirements of my processes employing them as heat transfer media.

It is accordingly an object of the present invention to provide new processes or methods for using new compositions of matter, the alkyl-aryl orthosilicates, particularly as heat transfer media.

Another object is to provide new processes or methods for using such new compounds and mixtures thereof as substitutes for water in the cooling of internal combustion engines.

Other and further objects will appear from the following description of these new processes.

It is not feasible to test each member of the large family of alkyl-aryl orthosilicates in my novel processes and in the following description the organic radicals, both aliphatic and aromatic, were selected for the purpose of obtaining the most significant results in my processes without testing all of its members. In general the aromatic radicals tested in my processes are the lowest and most common ones, phenyl and cresyl (tolyl), and the aliphatic radicals are the lowest and most common, methyl, ethyl and i-propyl. I have also tested certain other members of this family and these are briefly considered hereinafter.

As stated, this invention is directed to new processes using a new family of silicates as heat transfer media derived, in one preferred way, by the substitution of from one to three alkyl radicals for an equivalent number of aryl radicals in the tetra-aryl orthosilicates. These new silicates may be synthesized by three preferred methods each of which may be employed more advantageously with certain of the new compositions than with others. Of the three methods the most reliable is that of direct synthesis by reacting a mixture of an alcohol and one or more of a phenol, cresol, or the other elements of the aryl group with silicon tetrachloride. A second method, and one which is suitable for the lower alkyls, is that of transesterification in which radical interchange takes place between an aryl orthosilicate and an alkyl orthosilicate. The third method which I have employed is the reaction of an alcohol with an aryl silicate (alcoholysis). A fourth method may be used in which an alkyl-silicate is reacted with a phenol (phenol, cresol, xylenol, etc.).

The products of each of these methods are mixtures of tri-aryl-mono-alkyl, di-aryl-di-alkyl and mono-aryl-tri-alkyl esters with small percentages of tetra-alkyl and tetra-aryl esters which I have separated with a Todd fractionating column and then tested individually in my processes to determine that their viscosity, resistance to hydrolysis and other characteristics meet the requirements of my processes as heat transfer media.

The following table lists the syntheses required to produce the organic radicals identified above which I have selected as characteristic of this new family for use in my processes, identifying to four oxygen atoms, each of which is joined to an R group or radical. These four R groups must include at least one alkyl and at least one aryl group and may be designated as an alkyl-aryl orthosilicate.

I have found that these compounds are very suitable for use in my novel processes because I have found them to have the following desirable physical characteristics as compared to other silicates as shown below: This data is the result of experimentation and calculation and is accurate to the best of my present knowledge but may be subject to revision after further work is done with these and other more chemically pure fractions. These compounds were prepared on the basis of purity acceptable for commercial products and it is possible to further purify them with resulting changes in physical properties.

*Data sheet on alkyl-aryl silicates*

| Name | Formula | Molecular Weight (theor.) | Density | Boiling Point, °C. | | Kin. Viscosity, Centistokes | | |
|---|---|---|---|---|---|---|---|---|
| | | | | 10 mm. press. | atmos. press. | 37.8° C. | 25° C. | —35° C. |
| Trimethyl-monophenyl Sil | (CH$_3$O)$_3$SiOC$_6$H$_5$ | 214.29 | 1.103 (22° C.) | 100 | 226 | 1.38 | 1.7 | 8.84 |
| Dimethyl-diphenyl Sil | (CH$_3$O)$_2$Si(OC$_6$H$_5$)$_2$ | 276.36 | 1.132 (22° C.) | 162 | 305 | 2.56 | 3.3 | 33.7 |
| Monomethyl-triphenyl Sil | CH$_3$OSi(OC$_6$H$_5$)$_3$ | 338.43 | 1.16 (21° C.) | 220 | 378 | 5.49 | 8.0 | 323.8 |
| Trimethyl-monocresyl Sil | (CH$_3$O)$_3$SiOC$_6$H$_4$.CH$_3$ | 228.31 | 1.076 (22° C.) | 113 | 243 | 1.37 | 1.7 | 8.4 |
| Dimethyl-dicresyl Sil | (CH$_3$O)$_2$Si(OC$_6$H$_4$.CH$_3$)$_2$ | 304.40 | 1.095 (22° C.) | 178 | 325 | 3.10 | 4.2 | 51.0 |
| Monomethyl-tricresyl Sil | CH$_3$OSi(OC$_6$H$_4$.CH$_3$)$_3$ | 380.49 | 1.107 (20° C.) | 234 | 396 | 5.59 | 8.1 | 343.2 |
| Triethyl-monophenyl Sil | (C$_2$H$_5$O)$_3$SiOC$_6$H$_5$ | 256.38 | 1.027 (22° C.) | 119 | 251 | 1.41 | 1.7 | 7.62 |
| Diethyl-diphenyl Sil | (C$_2$H$_5$O)$_2$Si(OC$_6$H$_5$)$_2$ | 304.42 | 1.088 (23° C.) | 172 | 317 | 2.81 | 3.7 | 36.86 |
| Monoethyl-triphenyl Sil | C$_2$H$_5$OSi(OC$_6$H$_5$)$_3$ | 352.46 | 1.127 (24° C.) | 219 | 376 | 4.99 | 7.1 | 205.8 |
| Triethyl-monocresyl Sil | (C$_2$H$_5$O)$_3$SiOC$_6$H$_4$.CH$_3$ | 270.40 | 1.012 (24° C.) | 129 | 262 | 1.62 | 2.0 | 9.8 |
| Diethyl-dicresyl Sil | (C$_2$H$_5$O)$_2$Si(OC$_6$H$_4$.CH$_3$)$_2$ | 332.46 | 1.065 (20° C.) | 187 | 337 | 3.48 | 4.6 | 53.11 |
| Monoethyl-tricresyl Sil | C$_2$H$_5$OSi(OC$_6$H$_4$.CH$_3$)$_3$ | 394.52 | 1.091 (20° C.) | 238 | 401 | 6.97 | 10.3 | 515.6 |
| Tri-i-propyl-monophenyl Sil | (C$_3$H$_7$O)$_3$SiOC$_6$H$_5$ | 298.44 | 0.964 (26° C.) | 124 | 257 | 1.86 | 2.3 | 14.5 |
| Di-i-propyl-diphenyl Sil | (C$_3$H$_7$O)$_2$Si(OC$_6$H$_5$)$_2$ | 332.46 | 1.044 (26° C.) | 173 | 321 | 3.42 | 4.6 | 66.73 |
| Mono-i-propyl-triphenyl Sil | C$_3$H$_7$OSi(OC$_6$H$_5$)$_3$ | 366.48 | 1.112 (26° C.) | 220 | 378 | 6.34 | 8.0 | 467.8 |
| Tri-i-propyl-monocresyl Sil | (C$_3$H$_7$O)$_3$SiOC$_6$H$_4$.CH$_3$ | 312.46 | 0.967 (21° C.) | 136 | 272 | 2.29 | 3.0 | 23.6 |
| Di-i-propyl-dicresyl Sil | (C$_3$H$_7$O)$_2$Si(OC$_6$H$_4$.CH$_3$)$_2$ | 360.50 | 1.026 (21° C.) | 192 | 343 | 4.43 | 6.2 | 123.5 |
| Mono-i-propyl-tricresyl Sil | C$_3$H$_7$OSi(OC$_6$H$_4$.CH$_3$)$_3$ | 408.54 | 1.069 (22° C.) | 241 | 403 | 8.0 | 12.1 | 573.0 |
| Tri-n-butyl-monophenyl Sil | (C$_4$H$_9$O)$_3$SiOC$_6$H$_5$ | 340.53 | 0.961 (25° C.) | 172 | 317 | 2.3 | 2.9 | 19.6 |
| Di-n-butyl-diphenyl Sil | (C$_4$H$_9$O)$_2$Si(OC$_6$H$_5$)$_2$ | 360.52 | 1.027 (25° C.) | 202 | 355 | 3.4 | 4.6 | 55.4 |
| Mono-n-butyl-triphenyl Sil | C$_4$H$_9$OSi(OC$_6$H$_5$)$_3$ | 380.51 | 1.074 (25° C.) | 233 | 394 | 5.1 | 7.1 | 164.8 |
| Tri-i-butyl-monophenyl Sil | (C$_4$H$_9$O)$_3$SiOC$_6$H$_5$ | 340.53 | 0.958 (25° C.) | 160 | 302 | 2.8 | 3.7 | 34.7 |
| Di-i-butyl-diphenyl Sil | (C$_4$H$_9$O)$_2$Si(OC$_6$H$_5$)$_2$ | 360.52 | 1.023 (25° C.) | 195 | 346 | 4.1 | 5.7 | 116.9 |
| Mono-i-butyl-triphenyl Sil | C$_4$H$_9$OSi(OC$_6$H$_5$)$_3$ | 380.51 | 1.068 (25° C.) | 233 | 394 | 6.4 | 9.2 | 430.5 |
| Tri-n-amyl-monophenyl Sil | (C$_5$H$_{11}$O)$_3$SiOC$_6$H$_5$ | 382.62 | 0.890 (25° C.) | 180 | 328 | 2.6 | | |
| Di-n-amyl-diphenyl Sil | (C$_5$H$_{11}$O)$_2$Si(OC$_6$H$_5$)$_2$ | 388.58 | 0.944 (25° C.) | 198 | 350 | 3.1 | 3.9 | 34.9 |
| Mono-n-amyl-triphenyl Sil | C$_5$H$_{11}$OSi(OC$_6$H$_5$)$_3$ | 394.54 | 0.986 (25° C.) | 235 | 397 | 4.3 | 5.7 | 73.4 |
| Tri-i-amyl-monophenyl Sil | (C$_5$H$_{11}$O)$_3$SiOC$_6$H$_5$ | 382.62 | 0.942 (25° C.) | 186 | 335 | 3.2 | 4.2 | 39.6 |
| Di-i-amyl-diphenyl Sil | (C$_5$H$_{11}$O)$_2$Si(OC$_6$H$_5$)$_2$ | 388.58 | 0.979 (25° C.) | 207 | 362 | 3.8 | 5.1 | 64.5 |
| Mono-i-amyl-triphenyl Sil | C$_5$H$_{11}$OSi(OC$_6$H$_5$)$_3$ | 394.54 | 1.035 (25° C.) | 236 | 398 | 5.4 | 7.4 | 170.7 |
| Triethyl-mono-α-naphthyl Sil | (C$_2$H$_5$O)$_3$SiOC$_{10}$H$_7$ | 306.22 | 1.081 (25° C.) | 176 | 322 | 3.9 | 5.6 | 80.9 |
| Diethyl-di-α-naphthyl Sil | (C$_2$H$_5$O)$_2$Si(OC$_{10}$H$_7$)$_2$ | 404.22 | 1.144 (25° C.) | 232 | 393 | 19.2 | 34.3 | (1) |
| Monoethyl-tri-α-naphthyl Sil | C$_2$H$_5$OSi(OC$_{10}$H$_7$)$_3$ | 502.22 | 1.194 (25° C.) | 307 | 472 | 90.9 | 95.4 | (1) |

[1] No flow.

the types of reactions employed and the raw materials used:

| Orthosilicates | Type of Reaction | Raw Materials |
|---|---|---|
| methyl-phenyl | alcoholysis | methanol, phenyl silicate. |
| Do | direct synthesis | methanol, phenol, SiCl$_4$. |
| methyl-cresyl | alcoholysis | methanol, cresyl silicate. |
| Do | direct synthesis | methanol, cresol, SiCl$_4$. |
| ethyl-phenyl | radical interchange | ethyl silicate, phenyl silicate. |
| ethyl-cresyl | do | ethyl silicate, cresyl silicate. |
| isopropyl-phenyl | do | isopropyl silicate, phenyl silicate. |
| isopropyl-cresyl | do | isopropyl silicate, cresyl silicate. |
| Do | direct synthesis | isopropanol, cresol SiCl$_4$. |

These compounds have the following composition:

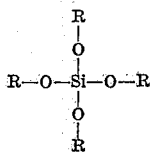

where a molecule comprises a silicon atom joined

Consideration of the viscosity characteristics for these new compounds show that for all the mono and di-aryl esters the points are on a straight line when plotted on A. S. T. M. Standard Viscosity-Temperature Chart, Chart C Kinematic Viscosity, High Range. This line is curved for all of the tri-aryl esters on the same type chart suggesting molecular association for tri and tetra-aryl silicates and the possibility that they are undercooled liquids.

The several compounds above described were tested down to —100° F. and were fluid and no points of crystallization or pour points were found. It may be that further purification of these compounds would change their freezing or pour points. They are therefore very useful heat transfer media in my novel processes in the lower temperature ranges. All of the alkyl-aryl orthosilicates tested have slower rates of hydrolysis than their corresponding aryl or alkyl silicates. The tri-aryl esters require an alkaline medium and the mono and di-aryl esters require an acid medium for hydrolysis and both must be highly concentrated and in large amount. The isopropyl-phenyl orthosilicates have been boiled with acid and with alkaline solutions for long periods before noticeable changes are observed and the isobutyl-aryl and the isoamyl-aryl silicates are even more resistant to hydrolysis. Resistance to hydrolysis is a requirement in most processes involving a liquid heat transfer medium and the high degree of resistance exhibited by these compounds make them eminently suitable for use in my novel processes.

Mixtures of these new compounds may be advantageously employed as heat transfer media in my processes and for other purposes, such mixtures being less costly than the pure compounds as the cost of fractionation is avoided. These mixtures are advantageous when the freezing or pour points of the components are higher than desirable since these mixtures are eutectic and have considerably lower freezing or pour points than those of the several components. Such mixtures exhibit improved characteristics as heat transfer media in my processes similar to those described above for the pure compounds.

Among the mixtures of the alkyl-aryl orthosilicates which I have synthesized and tested as a heat transfer medium in my processes are those of the n-butyl-phenyl orthosilicates. These mixtures exhibit the desirable properties of low viscosity and great thermal and hydrolytic stability.

Other suitable mixtures for heat transfer purposes are those of the ethyl-cresyl orthosilicates. These are mixtures having high thermal stability. Their boiling range is from that of triethyl-mono-cresyl orthosilicates to that of monoethyl-tri-cresyl orthosilicate and its viscosities approach those of di-ethyl-dicresyl orthosilicate.

Isopropyl-cresyl orthosilicate mixtures are also suitable for these purposes. The viscosities of these mixtures are somewhat lower than those of tricresyl-isopropyl orthosilicate but are higher than those of dicresyl-di-isopropyl orthosilicate.

I have also successfully used mixtures of the isopropyl-phenyl orthosilicates in my processes and have obtained excellent results with such mixtures in which tri-isopropyl-monophenyl orthosilicate predominates and di-isopropyl-diphenyl orthosilicate occurs in greater quantity than mono-isopropyl tri-phenyl orthosilicate.

My novel processes for employing these new compounds and mixtures thereof as heat transfer media have been generally described above and may be summarized by stating that these compounds and mixtures thereof may be used in many processes employing a liquid as the heat transfer medium where it is desired to either heat or cool by bringing the liquid into contact with a surface to be heated or cooled. Of more specific employment of these new compounds and mixtures thereof I have found that they are highly satisfactory when used as the cooling liquids in place of water in processes for cooling internal combustion engines.

Heretofore water has been commonly employed for this purpose. All of the methods for cooling internal combustion engines by water are unsatisfactory where the engine may cause coolant temperatures above the boiling point of water at atmospheric pressure or where the external temperatures are low enough to freeze the water when the engine is not in operation. Various anti-freezes such as ethanol, ethylene glycol, isopropanol, methanol and propylene glycol have been used and methods of handling the water in pressurized systems have been proposed to solve both of these difficulties but are only reasonably successful.

These antifreezing compounds and their physical characteristics are set out in detail in the National Bureau of Standards Circular 474 and attention is particularly called to Figures 1–3 thereof. Even the most cursory comparison of these figures with the characteristics of my new compounds conclusively demonstrates the advantages obtained by employing my new processes for cooling internal combustion engines. It is to be particularly noted that in mixtures of water and these antifreeze compounds it is necessary to sacrifice one end of their useful temperature range to improve the other and boiling points are lowered with lowered freezing points and vice versa. Further, most of these antifreeze compounds require corrosion inhibitors which only slow down corrosion and do not prevent it while my new compounds have no corrosive characteristics.

Mixtures of water and these antifreezes are employed at or near their boiling points with resultant large losses by evaporation requiring constant attention and replacement whereas my new compounds are employed at far below their boiling points and require no attention or replacement and once in a cooling system require no further consideration.

In employing my novel processes using these new compounds and mixtures thereof as the liquid heat transfer medium the disadvantages of water and/or mixtures thereof with antifreezing agents as a coolant may be completely overcome and at the same time very desirable advantages can be obtained. Since all of these compounds and mixtures thereof have a useful temperature range of from approximately —80° F. to above 500° F. it is obvious that the lower temperature range precludes freezing of such liquid heat transfer media in every conceivable climatic operating temperature and the upper range of temperatures is above the maximum metal temperatures attained in present day internal combustion engines. My processes for employing these compounds and mixtures thereof as the coolant in internal combustion engines therefore have a wide margin or operating safety on both ends of the temperature scale.

I have employed my novel processes for cooling internal combustion engines by utilizing existing cooling systems commonly employed with such engines and by substituting in such systems my new compounds and mixtures thereof for the water coolant. My methods of cooling have proved very successful in both gasoline and diesel types of engines without requiring modification of their existing cooling systems.

It will now be apparent that by the present invention I have provided novel processes employing new compositions of matter and mixtures thereof as heat transfer media suitable for use in a wide variety of heat transfer problems and well adapted for heat transfer in internal combustion engines in place of water.

Changes in or modifications to my novel methods and processes may now be suggested to those skilled in the art without departing from my invention concept and reference should be had to the appended claims to determine the scope of this invention.

What is claimed is:

1. In a process for transmitting heat to materials in indirect contact with a heat transmitting medium, the step of employing as a heat transmitting medium a mixture consisting essentially of at least two of the compounds tri-isopropyl-mono-phenyl orthosilicate, di-isopropyl-diphenyl orthosilicate and mono-isopropyl-triphenyl orthosilicate.

2. In a process for transmitting heat to materials in indirect contact with a heat transmitting medium, the step of employing as the heat transmitting medium a mixture consisting essentially of the three compounds tri-isopropyl-monophenyl orthosilicate, di-isopropyl-diphenyl orthosilicate and mono-isopropyl-triphenyl orthosilicate.

ETTORE DA FANO.

References Cited in the file of this patent

UNITED STATES PATENTS

| Number | Name | Date |
|---|---|---|
| 2,335,012 | Johnston | Nov. 23, 1943 |

OTHER REFERENCES

"The Chemistry of Aliphatic Orthoesters," Post, 1943, Reinhold Pub. Co., pp. 134.

Calingaert et al.: Jour. of American Chem. Soc., vol. 61, pp. 2748–2754, October 1939.